United States Patent
Jiang

(10) Patent No.: US 10,218,545 B2
(45) Date of Patent: Feb. 26, 2019

(54) POWER LINE COMMUNICATION DEVICE AND METHOD

(71) Applicant: VANGOCHIP TECHNOLOGIES,INC., Zhubei, Hsinchu County (TW)

(72) Inventor: Jeng-Shiann Jiang, Zhubei (TW)

(73) Assignee: Vangochip Technologies, Inc., Zhubei (TW)

( * ) Notice: Subject to any disclaimer, the term of this patent is extended or adjusted under 35 U.S.C. 154(b) by 0 days.

(21) Appl. No.: 15/920,017

(22) Filed: Mar. 13, 2018

(65) Prior Publication Data
US 2018/0295000 A1    Oct. 11, 2018

(30) Foreign Application Priority Data
Apr. 7, 2017 (TW) .............................. 106111641 A

(51) Int. Cl.
*H04B 3/54* (2006.01)
*H04L 27/00* (2006.01)
*H04L 27/26* (2006.01)
*H04B 1/69* (2011.01)

(52) U.S. Cl.
CPC ........... *H04L 27/0008* (2013.01); *H04B 1/69* (2013.01); *H04B 3/54* (2013.01); *H04L 27/2636* (2013.01)

(58) Field of Classification Search
CPC ... H04L 27/0008; H04L 27/2636; H04B 1/69; H04B 3/54
See application file for complete search history.

(56) References Cited

U.S. PATENT DOCUMENTS

| | | | |
|---|---|---|---|
| 2007/0047432 A1* | 3/2007 | Cho | H04L 5/023 370/203 |
| 2008/0008081 A1 | 1/2008 | Molina et al. | |
| 2009/0190537 A1 | 7/2009 | Hwang et al. | |
| 2012/0093198 A1* | 4/2012 | Dabak | H04B 3/542 375/139 |
| 2014/0112398 A1* | 4/2014 | Kamalizad | H04L 27/2655 375/257 |
| 2014/0241441 A1* | 8/2014 | Devaucelle | H04B 3/542 375/257 |
| 2017/0366230 A1* | 12/2017 | Pande | H04B 3/542 |

FOREIGN PATENT DOCUMENTS

WO    WO2016/127048    8/2016

* cited by examiner

*Primary Examiner* — Syed Haider
(74) *Attorney, Agent, or Firm* — Muncy, Geissler, Olds & Lowe, P.C.

(57) ABSTRACT

A power line communication (PLC) device is provided which communicates with another PLC device via a PLC signal transmitted over a wire in a broadband. The PLC signal comprises at least one frame. The at least one frame comprises a preamble, a frame control header and a payload. The preamble comprises at least one synchronization symbols used for a PLC engine to synchronize; at least one preamble code symbols used for specifying at least one of a sub-channel and a modulation mechanism; and at least one channel estimation symbols used for the PLC engine to do channel estimation.

14 Claims, 5 Drawing Sheets

POWER LINE COMMUNICATION DEVICE AND METHOD

BACKGROUND OF THE INVENTION

This application claims priority of No. 106111641 filed in Taiwan R.O.C. on Apr. 7, 2017 under 35 USC 119, the entire contents of which are hereby incorporated by reference.

Field of the Invention

The invention relates to a power line communication device and method, and more particularly, to a power line communication device and method capable of selecting channels and modulation mechanisms.

Description of the Related Art

Power line communications (PLC) include systems for transmitting data over the same medium (i.e., a wire or conductor) that is also used to transmit electric power to residences, buildings, and other premises. U.S. Pat. No. 9,172,431 discloses a power distribution system for power line communication. FIG. 1 shows a schematic diagram of a conventional electric power distribution system. As shown in FIG. 1, Medium voltage (MV) power lines 103 from substation 101 typically carry voltage in the tens of kilovolts range. Meters 106a-n are typically mounted on the outside of any type of residences 102a-n for receiving or consuming electricity. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n. Panel 107 provides an interface between meter 106n and electrical wires 108 within residence 102n. Electrical wires 108 deliver power to outlets 110, switches 111 and other electric devices within residence 102n.

PLC gateways (or modems) 112a-n at the residences 102a-n may use MV/LV lines 103/105 to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. PLC gateways 112a-n may enable AC or DC charging of electric vehicles. An example of an AC or DC charger is illustrated as PLC device 113. The above-mentioned power line communication networks may provide street lighting control and remote power meter data collection.

Data concentrators 114 may be coupled to control center 130 (e.g., a utility company) via network 120. Network 120 may include, for example, the Internet, a cellular network, a WiFi network, a WiMax network, or the like. As such, control center 130 may be configured to collect power consumption and other types of relevant information from gateway(s) 112 and/or device(s) 113 through concentrator(s) 114.

At present, the power line communication system has been widely used in the Smart Grid. The conventional power line communication protocol can be roughly divided into two types. The first one adopts a narrowband OFDM as a modulation mechanism and the second one adopts a wideband OFDM. The power line communication protocol of a narrowband OFDM includes G3, PRIME, IEEE1901.2 and Ghnem, which use the bandwidth from 200~600 KHz. Currently, the protocol of a broadband OFDM includes only IEEE1901.1 which is still under development and uses signal bandwidth up to 12.5 MHz, being 20 times the narrowband OFDM.

There is no channel switching mechanism in the narrowband OFDM protocol, and IEEE1901.1, a wideband OFDM protocol, has established a channel switching mechanism which is mainly controlled by a concentrator 114 through beacons. OFDM modulation takes full advantage of high-speed bandwidth transmission and has a very good tolerance for multi-path channel. However, OFDM is still unable to achieve the same stable transmission as Spread Spectrum at very low signal to noise ratios.

The channel switching mechanism is required since each sub-channel has different channel quality. If the best sub-channel transmission is chosen, the communication may be more rapid and stable. According to G3, PRIME, IEEE1901.2, Ghnem and other narrowband OFDM communication protocol, there is no channel switching mechanism since the channel is too narrow. The channel switching mechanism stipulated by IEEE1901.1 in v0.1 version is controlled by a concentrator 114 through beacons. This approach has the following disadvantages.

1. In the 50 Hz power line system, the period of the beacons of the concentrator 114 is 40 ms, so that the switching can only be performed every 40 ms.
2. Because the channel switching is controlled centrally by the concentrator 114, each meter in the power line network must use the same sub-channel at the same time point. However, the best sub-channels for different meters are actually different. As a result, this switching method cannot be optimized for all meters.
3. When there are many meters in the network, there will be some meters located far away from the concentrator 114. The beacons sent by the concentrator 114 may not be received by these meters, which become hidden nodes. This can cause the meters to go offline and must be reconnected with the concentrator 114, so that the overall performance of the entire network is reduced.
4. The timing of channel switching for all meters must be universal. If the switching time have differences or error among meters, there will be packet loss. When the meters are made by different manufacturers, the differences or error of the switching time will be more serious.

OFDM modulation takes full advantage of high-speed data transmission by efficiently using the bandwidth and has a very good tolerance for multi-path channels. However, OFDM is still unable to achieve the same stable transmission as Spread Spectrum at very low signal to noise ratios. The smart grid utilizing OFDM modulation can only cover narrower range. In a large community having thousands of households, the meter-reading may not be successful for the meters at the outskirt of the grid.

FIG. 2 shows a schematic diagram of a conventional frame format. As shown in FIG. 2, the format of the conventional frame 120 includes a preamble 121, a frame control header 122 and a payload 123. The preamble 121 includes a plurality of synchronization symbols P1-P6 and M1, which are used as signals for synchronization. In addition, there are only synchronization symbols in the preamble of the protocols such as G3, PRIME, IEEE1901.2, Ghnem and IEEE1901.1.

For the purpose of channel selection, U.S. Pat. No. 9,172,431 proposes a technique of using a beacon to achieve channel selection in power line communications. The method includes steps of defining a plurality of frames, each of the frames having a plurality of time slots, assembling a pair of beacons within each time slot in each frame, and then selecting the channels by scanning the frames and the beacons. However, the technique of the above patent still has the aforementioned problems. Therefore, a new solution is needed.

SUMMARY OF THE INVENTION

It is an object of one embodiment of the present invention to provide a power line communication (PLC) device and method capable of selecting at least one of a plurality of modulation mechanisms and a plurality of sub-channels and FFT size.

According to an embodiment of the invention, a power line communication (PLC) device is used for communicating with another PLC device via a PLC signal transmitted over the broadband of a wire. The PLC device comprises a PLC engine configured to encode or decode the PLC signal. The PLC signal comprises at least one frame. The at least one frame comprises a preamble, a frame control header, and a payload. The preamble comprises: a plurality of synchronization symbols used for the PLC engine to synchronize; a plurality of preamble code symbols used for specifying at least one of a plurality of modulation mechanisms, a plurality of sub-channels in the broadband, and the FFT size; and a plurality of channel estimation symbols used for the PLC engine to do channel estimation.

In an embodiment, the modulation mechanisms include a first modulation mechanism and a second modulation mechanism. The preamble code symbols of the preamble specify the first modulation mechanism. The PLC engine receives the PLC signal from the another PLC device and demodulates the at least one frame of the PLC signal. The PLC engine selects the first modulation mechanism according to the preamble code symbols and uses the first modulation mechanism to demodulate the frame control header and the payload.

In an embodiment, the sub-channels of the broadband include a first sub-channel and a second sub-channel. The preamble code symbols of the preamble further specify the first sub-channel. The PLC engine selects the first sub-channel according to the preamble code symbols and uses the first sub-channel to demodulate the frame control header and the payload.

In an embodiment, the sub-channels of the broadband include a third sub-channel. The preamble code symbols of the preamble further specify the third sub-channel. The PLC engine further selects the third sub-channel according to the preamble code symbols and uses the first and third sub-channels to demodulate the frame control header and the payload.

In an embodiment, the synchronization symbols and the preamble code symbols are transmitted via all of the sub-channels. In an embodiment, the sub-channel in which the channel estimation symbols is transmitted are the same as the sub-channel in which the frame control header and the payload is transmitted. In an embodiment, the broadband further includes a reserved sub-channel, the synchronization symbols and the preamble code symbols are not transmitted via the reserved sub-channel, and the preamble code symbols of the preamble do not specify the reserved sub-channel. In an embodiment, the first modulation mechanism is an Orthogonal Frequency Division Multiplexing (OFDM) modulation, and the second modulation mechanism is a spread spectrum modulation.

According to an embodiment of the invention, a power line communication (PLC) method is provided which is applied to a PLC device having a PLC engine to communicate with another PLC device having another PLC engine via a PLC signal transmitted over a wire in a broadband. The method comprises the following step: using the another PLC engine of the another PLC device to form the PLC signal. The PLC signal comprises at least one frame. The at least one frame comprises a preamble, a frame control header and a payload, the preamble comprises: a plurality of synchronization symbols used for the PLC engine to synchronize; a plurality of preamble code symbols used for specifying at least one of a plurality of modulation mechanisms and a plurality of sub-channels in the broadband; and a plurality of channel estimation symbols used for the PLC engine to do channel estimation.

In an embodiment, the modulation mechanisms include a first modulation mechanism and a second modulation mechanism. The preamble code symbols of the preamble specify the first modulation mechanism. The method further comprises the step of using the PLC engine to receive the PLC signal from the another PLC device and demodulates the at least one frame of the PLC signal. The PLC engine selects the first modulation mechanism according to the preamble code symbols and uses the first modulation mechanism to demodulate the frame control header and the payload.

In an embodiment, the sub-channels of the broadband include a first sub-channel and a second sub-channel. The preamble code symbols of the preamble further specify the first sub-channel. The method further comprises the step of using the PLC engine to receive the PLC signal from the another PLC device and demodulates the at least one frame of the PLC signal. The PLC engine selects the first sub-channel according to the preamble code symbols and uses the first sub-channel to demodulate the frame control header and the payload.

In an embodiment, the method further comprises the step of using the another PLC engine to transmit the synchronization symbols and the preamble code symbols via all of the sub-channels. In an embodiment, the method further comprises the step of using the another PLC engine to transmit the channel estimation symbols via the sub-channel the same as the sub-channel in which the frame control header and the payload are transmitted. In an embodiment, the first modulation mechanism is an Orthogonal Frequency Division Multiplexing (OFDM) modulation, and the second modulation mechanism is a spread spectrum modulation.

According to an embodiment of the invention, the channel switching is performed independently by each frame; specifically it is controlled individually by the preamble code PC of each frame. Since the channel switching is not universally controlled by beacons transmitted by the concentrator 104, the channel switching can be easily controlled. In an embodiment, the preamble code symbols can also specify a modulation mechanism, so that the device and method can switch over multiple modulation mechanisms. In addition, the preamble code can further control the FFT size of OFDM, so that the FFT size of FCH and payload can be adjusted accordingly.

BRIEF DESCRIPTION OF THE DRAWINGS

The following detailed description and accompanying drawings are intended to be illustrative, not limiting, of the invention, and can provide a more complete understanding of the invention.

DETAILED DESCRIPTION OF THE INVENTION

Figure 1:
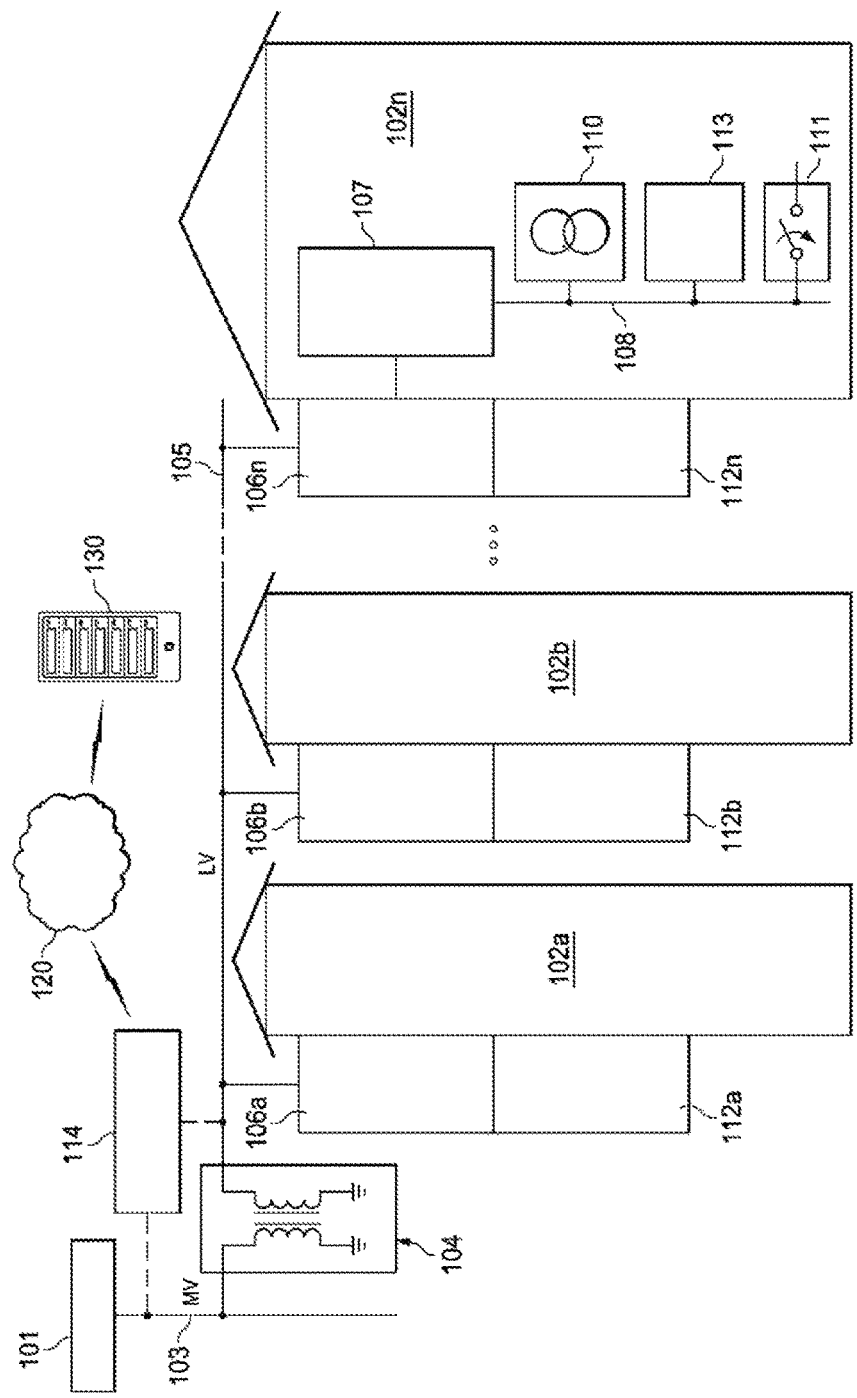
FIG. 1 shows a schematic diagram of a conventional electric power distribution system.
Figure 2:
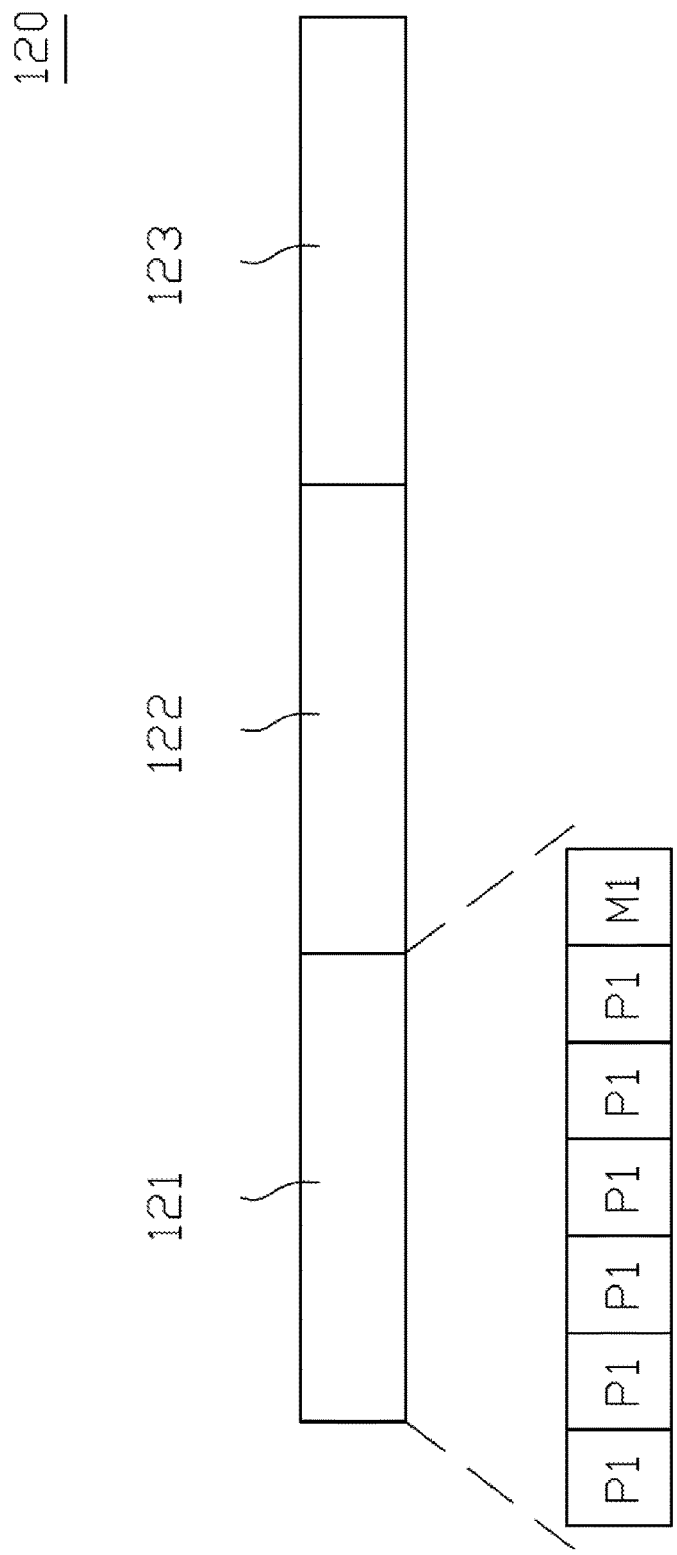
FIG. 2 shows a schematic diagram of a conventional frame.

According to an embodiment of the present invention, the functions of channel switching and coexistence of multiple modulation mechanisms and adjustment of OFDM FFT size are achieved by using a preamble code embodied in the preamble. The embodiments of the present invention will be described in detail below with reference to the drawings, in which the same reference numerals will be used to identify the same or similar elements of a plurality of viewpoints. It should be noted that the drawing should be viewed in the direction of the reference numerals.

Figure 3:
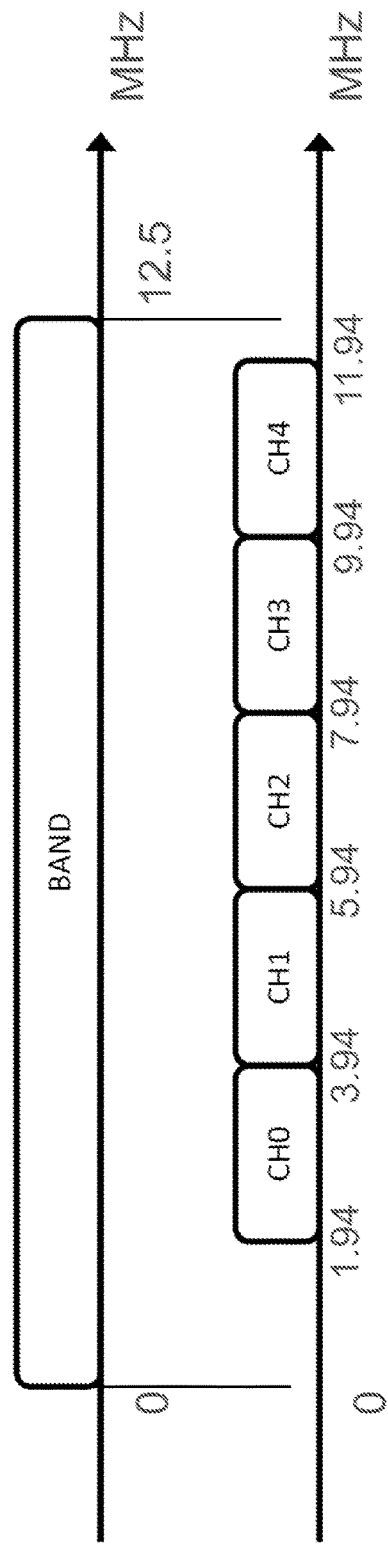
FIG. 3 shows a schematic diagram of frequency division according to an embodiment of the present invention.

FIG. 3 shows a schematic diagram of frequency division according to an embodiment of the present invention. In an embodiment, the broadband BAND is firstly divided into several sub-channels CH0-CH4. As shown in FIG. 3, in the example of channel division according to this embodiment, the overall bandwidth of the broadband BAND is 12.5 MHz and is divided into five sub-channels CH0-CH4, the bandwidth of each sub-channel CH0-CH4 is 2 MHz. Unused frequencies are reserved due to regulatory restrictions and the need to guard bands.

In an embodiment, two modulation mechanisms are used. One is Orthogonal Frequency Division Multiplexing (OFDM) and the other one is Spread Spectrum (SS) Communication. OFDM is a multi-carrier transmission technology, which divides the available spectrum into multiple subcarriers, each of which can carry a low-speed data stream. OFDM modulation can achieve high-speed transmission, suitable for the future smart city applications, while the spread spectrum communication can provide a wider coverage of a smart grid than OFDM. There are several types of spread spectrum communications to be chosen, including, for example, DSSS, FHSS, CSS and CFS-OFDM spread spectrum technologies.

Figure 4:
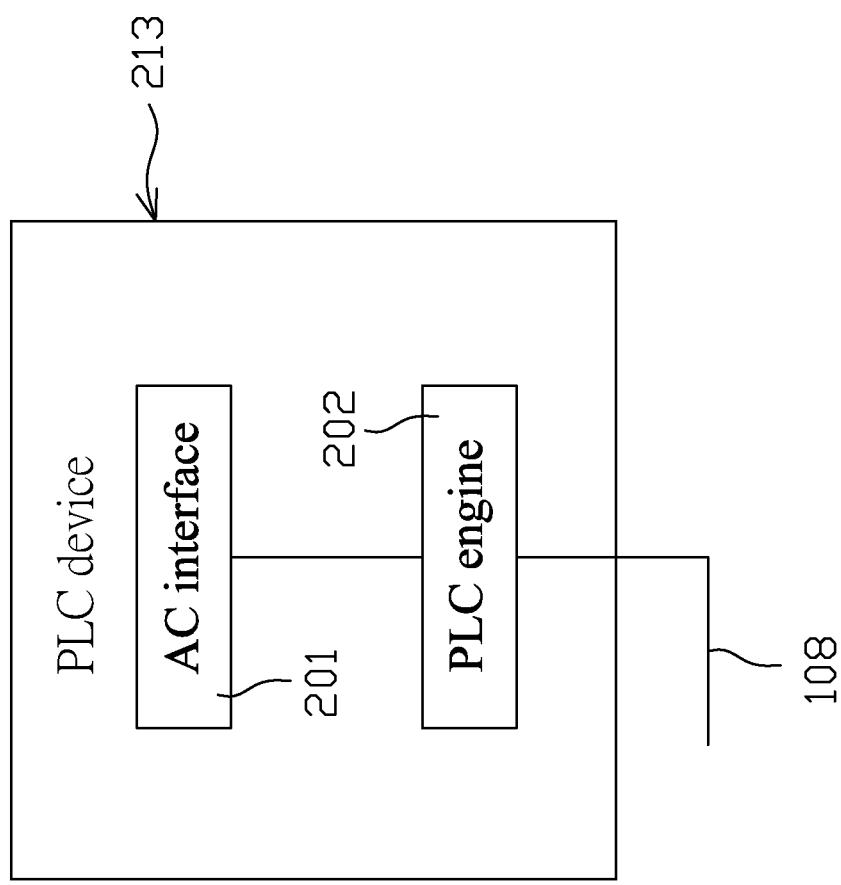
FIG. 4 shows a function block of a PLC device according to an embodiment of the present invention.

FIG. 4 shows a function block of a PLC device according to an embodiment of the present invention. As shown in FIG. 4, in an embodiment, the PLC device 213 includes an alternating current (AC) interface 201 and a PLC engine 202. The AC interface 201 is connected to a wire 108. The PLC engine 202 is configured to transmit or receive PLC signals over the wires 108 through the AC interface 201 using a broadband. In this embodiment, the PLC engine 202 may transmit an OFDM signal, and in another embodiment, may further transmit a spread spectrum modulation signal.

The PLC engine 202 may act as a transmitter that encodes a data (e.g., instructions or information) into one or more PLC signals, and transmits over a wire 108 to other PLC devices or data concentrator 114 (shown in FIG. 1) which is a PLC device and processes the information. Conversely, the PLC engine 202 may act as a receiver that receives and decodes the PLC signals encoded by other PLC devices or data concentrators 114 to obtain the aforementioned data, and then, according to the aforementioned data, the PLC engine 202 selects an operation sub-channel from the sub-channels CH0-CH4 and an operation modulation mechanism.

Figure 5:
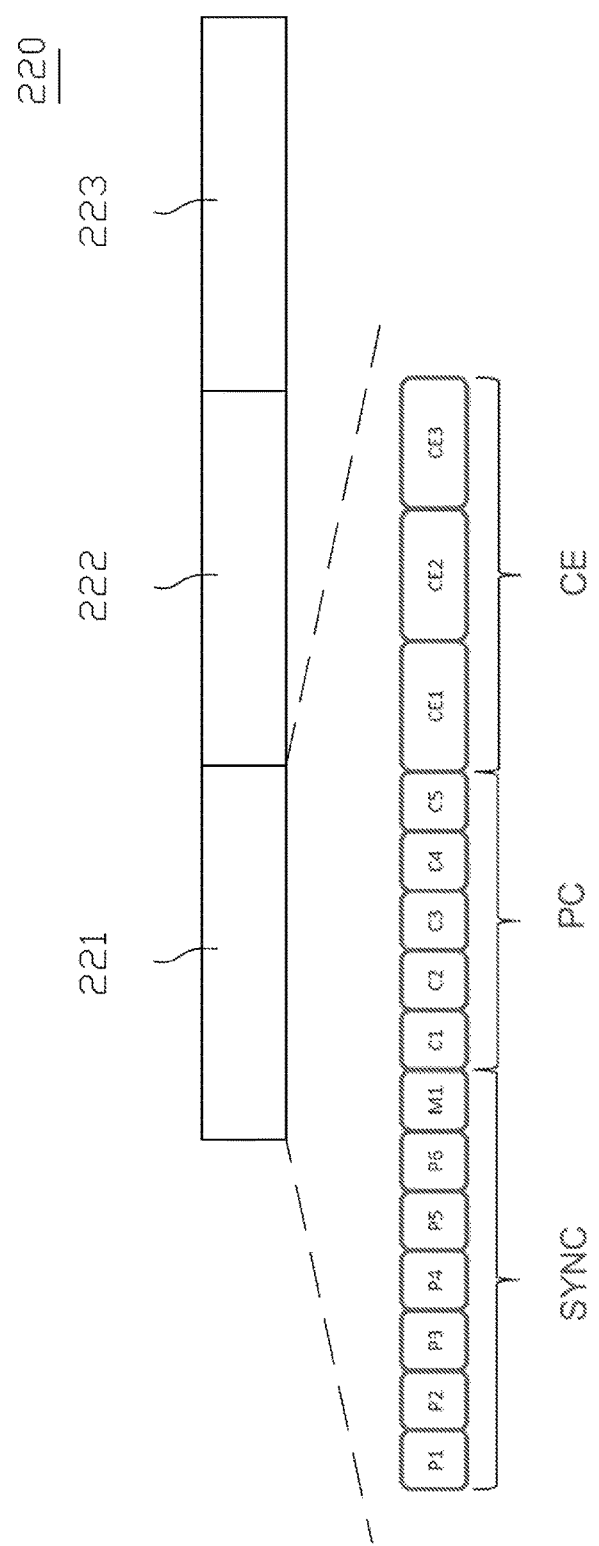
FIG. 5 shows a schematic diagram of a frame according to an embodiment of the present invention.

FIG. 5 shows a schematic diagram of a frame according to an embodiment of the present invention. As shown in FIG. 5, in an embodiment, each frame 220 includes a preamble 221, a frame control header 222, and a payload 223. The format of the preamble 221 includes a synchronization field SYNC, a preamble code field PC, and a channel estimation field CE. Please note that this preamble format is just an example, and the present invention is not limited thereto. There are many different types of preamble formats. As long as the preamble code located before the frame control header can be used to determine the desired sub-channel and modulation mechanism, its format belongs to an embodiment of the present invention. Moreover, this example is not intended to limit the present invention, and persons having ordinary skill in the art may make various changes and modifications without departing from the spirit and scope of the present invention.

As shown in FIG. 5, the synchronization field SYNC includes six SYNCP synchronization symbols P1-P6 and one SYNCM synchronization symbol M1. The waveform of the SYNCM is opposite to the waveform of the SYNCP and can be used to detect the boundary of the synchronization field SYNC. The synchronization field SYNC is used for detection of the presence of the frame 220 (packet detection), automatic gain control, time offset and frequency offset estimation, and symbol boundary detection. In addition, the symbols of the synchronization field SYNC are characterized by their low peak to average power ratio, so they can be transmitted by a higher average power with low-cost amplifier to improve the detection accuracy of the frame 220.

The preamble code symbols C1-C5 can have the same waveform as the waveform of the synchronization symbols of the synchronization field SYNC, so as to have the characteristics of low peak to average power ratio. The preamble code symbols C1-C5 can be encoded in both positive and negative value of the waveforms of the synchronization symbols. In this embodiment, the preamble code PC has five preamble code symbols C1-C5, whose positive values are transmitted by using the waveform same as SYNCP, and whose negative values are transmitted by using the waveform same as SYNCM. In an embodiment, it is determined by whether the polarity of the present symbol is opposite to the polarity of the previous symbol or not, so that the symbols can be determined to stand for 0 or 1. Table 1 is a code example of the preamble code PC. As shown in Table 1, when C5C4C3C2C1 is 01100, the OFDM modulation is designated to modulate the frame control header and payload symbols, and the CH1 to CH2 sub-channels are designated to transmit frame control header and payload symbols by using subcarriers. When C5C4C3C2C1 is 10101, the SS modulation is designated to modulate the frame control header and payload symbols, and the CH1 to CH2 sub-channels are designated to transmit frame control header and payload symbols by using subcarriers, and so on.

TABLE 1

| C5C4C3C2C1 | Mode | CH0 | CH1 | CH2 | CH3 | CH4 |
|---|---|---|---|---|---|---|
| 00000 | OFDM | v | | | | |
| 00010 | OFDM | | v | | | |
| 00100 | OFDM | | | v | | |
| 01000 | OFDM | | | | v | |
| 10000 | OFDM | | | | | v |
| 00110 | OFDM | v | v | | | |
| 01100 | OFDM | | v | v | | |
| 11000 | OFDM | | | v | v | |

TABLE 1-continued

| C5C4C3C2C1 | Mode | CH0 | CH1 | CH2 | CH3 | CH4 |
|---|---|---|---|---|---|---|
| 01010 | OFDM | | | | v | v |
| 11011 | SS | v | v | v | v | |
| 10101 | SS | | v | v | v | v |
| 11111 | SS | v | v | v | v | v |
| others | reserved | | | | | |

As described above, the frame control header and payload symbols are transmitted by using the sub-channels designated by the preamble code symbols C1-C5. In contrast, the synchronization symbols P1-P6 and M1 and the preamble code symbols C1-C5 are transmitted over all CH0 to CH4 sub-channels by using the subcarriers. This ensures that all nodes in the grid can receive synchronization symbols P1-P6 and M1 and preamble code symbols C1-C5. In an embodiment, the broadband further includes a reserved sub-channel, the reserved sub-channel may be a regulatory band or a guard band, and the reserved sub-channel cannot be used to transmit any of the foregoing symbols.

After receiving the preamble code PC, the PLC device 213 as a receiver can determine the modulation mode of the frame control header and payload symbols by using the five preamble code symbols C1-C5, and select the modulation mechanism or sub-channel specified by the preamble code symbols C1-C5 to demodulate the frame control header and payload symbols. In this embodiment, the channel estimation codes CE includes the symbols CE1-CE3 used to achieve the function of the channel estimation, and the following frame control and payload symbols may be demodulated on the basis of the channel estimation. When the receiver is operating, the sub-channels of the frame control header and payload symbols are determined according to the information of the preamble code symbols C1-C5. The frame control header and payload symbols are transmitted only via the sub-channels specified by the preamble code PC. The channel estimation symbols CE1-CE3 may be transmitted via the sub-channels same as the sub-channels of the frame control header and payload symbols. It can be seen from the above that an embodiment of the present invention performs channel switching and modulation selection according to the preamble code PC. Since the symbols of the synchronization field SYNC have a very low detection error rate, they are very suitable for encoding the preamble code.

In an embodiment, the lengths of the preamble symbol and the channel estimation symbol may be separately set to be different, so that the OFDM signals with different Fast Fourier Transform (FFT) lengths are simultaneously supported. For example, the length of the channel estimation symbol is greater than the length of the preamble symbol. As shown in FIG. 5, the channel estimation symbols may be inserted after the preamble code symbols, and the length of the channel estimation symbols may be twice that of the preamble symbols so that the OFDM signals with different Fast Fourier Transform (FFT) lengths, such as a OFDM signal with an FFT length of 1024 and a OFDM signal with an FFT length of 2048, are simultaneously supported. In an embodiment, the length of the FFT of the OFDM modulation can be specified by using the preamble code. When the length of the FFT of the OFDM modulation is 2048, the length of the preamble symbol being less than 1024 cannot be used to conduct the channel estimation. According to this embodiment, since the length of the channel estimation symbols is twice that of the preamble code symbols, the channel estimation of the FFT whose length is 2048 can be performed. The OFDM with longer FFTs has better anti-multipath interference capability than the shorter FFTs, but is less favorable in time-varying channels. Therefore, this embodiment proposes an OFDM modulation technology that can select different FFT lengths by using preamble codes, so that the OFDM signal may be appropriately processed.

According to an embodiment of the present invention, the channel switching is performed independently by each frame 220; specifically it is controlled individually by the preamble code PC of each frame 220. Since the channel switching is not universally controlled by beacons transmitted by the concentrator 104, the various shortcomings of the channel switching mechanism stipulated by the version v0.1 of IEEE1901.1 can be overcome. More specifically, the advantages of an embodiment of the present invention include at least one of the following.

1. Each frame 220 can designate a different sub-channel, and the channel switching is not universally controlled by beacons stipulated by IEEE1901.1 protocol. As a result, there is no shortcoming that the channel switching can only be conducted once every 40 ms.
2. Each node in the power grid can choose different sub-channels at any time, so there is no shortcoming that all nodes in the IEEE1901.1 protocol must use the same sub-channels within 40 ms.
3. The channel switching is not universally controlled by the concentrator 114, so there is no disadvantage of leaving hidden nodes offline due to channel switching.
4. It is not required that the sub-channels of all nodes should be switched at the same time points, so there is no packet loss due to the channel switching and there is also no problem of time differences of the channel switching between the different devices made by different manufacturers.
5. By using the preamble code PC, a variety of modulation mechanisms can co-exist in the power grid, and then the power grid can take advantage of use of different modulation mechanisms. For example, when the distance between nodes is short, a high-speed OFDM modulation may be adopted to reduce the time of occupying the sub-channels. When the distance between nodes is long, the spread spectrum may be chosen to increase coverage of data transmission.
6. The lengths of the preamble symbol and the channel estimation symbol may be separately set to be different, so that the OFDM signals with different Fast Fourier Transform (FFT) lengths are simultaneously supported.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A power line communication (PLC) device for communicating with another PLC device via a PLC signal transmitted over a wire in a broadband, comprising:
   a PLC engine configured to encode or decode the PLC signal,
   wherein,
   the PLC signal comprises at least one frame,
   the at least one frame comprises a preamble, a frame control header and a payload, and
   the preamble comprises:
      a plurality of synchronization symbols used for the PLC engine to synchronize;

a plurality of preamble code symbols used for specifying at least one of a plurality of modulation mechanisms and a plurality of sub-channels in the broadband; and a plurality of channel estimation symbols used for the PLC engine to do channel estimation, and wherein the modulation mechanisms include a first modulation mechanism and a second modulation mechanism, the preamble code symbols of the preamble specify the first modulation mechanism, the PLC engine receives the PLC signal from the another PLC device and demodulates the at least one frame of the PLC signal, wherein the PLC engine selects the first modulation mechanism according to the preamble code symbols and uses the first modulation mechanism to demodulate the frame control header and the payload, the sub-channels of the broadband include a first sub-channel and a second sub-channel, the preamble code symbols of the preamble further specify the first sub-channel, the PLC engine selects the first sub-channel according to the preamble code symbols and uses the first sub-channel to demodulate the frame control header and the payload.

2. The PLC device according to claim 1, wherein the length of the channel estimation symbols is greater than the length of the preamble code symbols.

3. The PLC device according to claim 1, wherein the synchronization symbols comprise a first synchronization symbol and a second synchronization symbol, and the waveform of the first synchronization symbol is opposite to the waveform of the second synchronization symbol, the preamble code symbols have the waveforms being the same as the waveforms of the first and second synchronization symbols, and are encoded by using the waveforms of the first and second synchronization symbols.

4. The PLC device according to claim 1, wherein the sub-channels of the broadband include a third sub-channel, the preamble code symbols of the preamble further specify the third sub-channel, the PLC engine further selects the third sub-channel according to the preamble code symbols and uses the first and third sub-channels to demodulate the frame control header and the payload.

5. The PLC device according to claim 1, wherein the synchronization symbols and the preamble code symbols are transmitted via all of the sub-channels.

6. The PLC device according to claim 5, wherein the sub-channel in which the channel estimation symbols are transmitted is the same as the sub-channel in which the frame control header and the payload are transmitted.

7. The PLC device according to claim 5, wherein the broadband further includes a reserved sub-channel, the synchronization symbols and the preamble code symbols are not transmitted via the reserved sub-channel, and the preamble code symbols of the preamble do not specify the reserved sub-channel.

8. The PLC device according to claim 1, wherein the first modulation mechanism is an Orthogonal Frequency Division Multiplexing (OFDM) modulation, and the second modulation mechanism is a spread spectrum modulation.

9. A power line communication (PLC) method applied to a PLC device having a PLC engine to communicate with another PLC device having another PLC engine via a PLC signal transmitted over a wire in a broadband, comprising:

using the another PLC engine of the another PLC device to form the PLC signal, wherein, the PLC signal comprises at least one frame, the at least one frame comprises a preamble, a frame control header and a payload, and the preamble comprises:

a plurality of synchronization symbols used for the PLC engine to synchronize;

a plurality of preamble code symbols used for specifying at least one of a plurality of modulation mechanisms and a plurality of sub-channels in the broadband; and a plurality of channel estimation symbols used for the PLC engine to do channel estimation, and wherein the modulation mechanisms include a first modulation mechanism and a second modulation mechanism, the sub-channels of the broadband include a first sub-channel and a second sub-channel, the preamble code symbols of the preamble specify the first modulation mechanism, the preamble code symbols of the preamble further specify the first sub-channel, and the method further comprising:

using the PLC engine to receive the PLC signal from the another PLC device and demodulates the at least one frame of the PLC signal, wherein the PLC engine selects the first modulation mechanism according to the preamble code symbols and uses the first modulation mechanism to demodulate the frame control header and the payload, and wherein the PLC engine selects the first sub-channel according to the preamble code symbols and uses the first sub-channel to demodulate the frame control header and the payload.

10. The PLC method according to claim 9, wherein the length of the channel estimation symbols is greater than the length of the preamble code symbols.

11. The PLC method according to claim 9, wherein the synchronization symbols comprise a first synchronization symbol and a second synchronization symbol, and the waveform of the first synchronization symbol is opposite to the waveform of the second synchronization symbol, the preamble code symbols have the waveforms being the same as the waveforms of the first and second synchronization symbols, and are encoded by using the waveforms of the first and second synchronization symbols.

12. The PLC method according to claim 9, using the another PLC engine to transmit the synchronization symbols and the preamble code symbols via all of the sub-channels.

13. The PLC method according to claim 12, using the another PLC engine to transmit the channel estimation symbols via the sub-channel the same as the sub-channel in which the frame control header and the payload are transmitted.

14. The PLC method according to claim 9, the first modulation mechanism is an Orthogonal Frequency Division Multiplexing (OFDM) modulation, and the second modulation mechanism is a spread spectrum modulation.

* * * * *